United States Patent
Brief

(10) Patent No.: US 8,286,188 B1
(45) Date of Patent: Oct. 9, 2012

(54) METHOD AND APPARATUS FOR ADVANCED INTERPROCESS COMMUNICATION

(75) Inventor: David Brief, Modiin (IL)

(73) Assignee: Marvell Israel (M.I.S.L.) Ltd., Yokneam (IL)

( * ) Notice: Subject to any disclaimer, the term of this patent is extended or adjusted under 35 U.S.C. 154(b) by 1199 days.

(21) Appl. No.: 12/110,717

(22) Filed: Apr. 28, 2008

Related U.S. Application Data

(60) Provisional application No. 60/914,530, filed on Apr. 27, 2007.

(51) Int. Cl.
*G06F 13/00* (2006.01)
(52) U.S. Cl. ........................................ 719/312; 719/314
(58) Field of Classification Search .................. 719/312, 719/314
See application file for complete search history.

(56) References Cited

U.S. PATENT DOCUMENTS

| | | | | |
|---|---|---|---|---|
| 5,956,754 A | * | 9/1999 | Kimmel | 711/206 |
| 6,044,477 A | * | 3/2000 | Jordan et al. | 714/39 |
| 7,188,229 B2 | * | 3/2007 | Lowe | 711/207 |

* cited by examiner

*Primary Examiner* — Andy Ho

(57) ABSTRACT

An interprocess memory controller is described that may be used to provide multiple processes within a multi-process device with access to a shared physical memory. The described interprocess memory controller may enforce access rights to shared memory that has been allocated to the respective processes, thereby guarding the multi-process device from instability due to the unauthorized overwriting and/or unauthorized freeing of allocated memory. The described interprocess memory controller approach may streamline interprocess communication by allowing data associated with an interprocess communication to be passed from a first process to a second process by passing a pointer as well as access rights to a buffer in shared memory that contains the message data. In this manner, the described interprocess memory controller approach may avoid the inefficiency of interprocess communication approaches that copy message data from a shared memory controlled by a first process to a shared memory controlled by a second process.

25 Claims, 12 Drawing Sheets

METHOD AND APPARATUS FOR ADVANCED INTERPROCESS COMMUNICATION

INCORPORATION BY REFERENCE

This application claims the benefit of U.S. Provisional Application No. 60/914,530, "Advanced Interprocess Communication," filed by David Brief on Apr. 27, 2007, which is hereby incorporated by reference in its entirety.

BACKGROUND

A multi-process device may be described as a processing device that supports the concurrent execution of multiple computing processes. One example of a multi-process device may have multiple semiconductor integrated circuit hardware processors, each hardware processor capable of executing one or more physically concurrent computing processes. Another example of a multi-process device may include only a single hardware processor, but the single hardware processor may support the concurrent execution of multiple software/firmware based computing processes, e.g., using time-sliced execution. Still other multi-process devices may use multiple hardware processors that support the execution of multiple physically concurrent computing processes as well as the time-sliced execution of multiple computing processes.

Multi-process devices may be included in virtually any processor-based digital electronic device. Such products may include, but are not limited to: computing devices, such as computer servers, desktop computers, laptop computers and hand-held computers; communication devices, such as cell phones, digital radios and digital communication switches; consumer entertainment products such as digital televisions, digital versatile disc (DVD) players, digital cameras and digital camcorders; and control systems, such as control systems used in automobiles, aircraft, HVAC environmental controls and security systems.

Each process executed by a multi-process device requires the use of electronic memory to store one or more executable instructions, control parameters, input data for processing, intermediate data values generated as a result of the process and/or final output generated as a result of the process. However, due to space constraints, and/or to reduce complexity and thereby increase reliability and manufacturing process yields, semiconductor integrated circuit hardware processors, one or more of which may be integrated within a multi-process device, typically include only a limited amount of memory storage. Typically, a multi-process device will include one or more memory controllers, e.g., one or more direct memory access (DMA) controllers, that allow the processes executed by the multi-process device to use physical memory, e.g., synchronous dynamic random access memory (SDRAM), double data rate synchronous dynamic random access memory (DDR-SDRAM), static random access memory (SRAM), etc., that is located on an separately manufactured semiconductor integrated circuit. In this manner, a multi-process device may be configured with access to sufficient memory to meet the processing requirements of the multiple concurrently executing computing processes the multi-process device will support.

Processes executed by a multi-process device may communicate with each other by passing information and data between the respective processes. Such interprocess communication allows complex tasks performed by the multi-process device to be divided into less complex subtasks that may be performed by separate processes executed by the multi-process device. In such a configuration, the respective processes executed by a multi-processor device may communicate with each other to share status and/or intermediate and/or final processed results, as needed, to support the coordinated execution of a larger task.

Current techniques used for passing information and data between processes in a multi-process device are inefficient. For example, to support interprocess communication, existing techniques require that data be copied from a memory area controlled by a first process, or source process, to a memory area controlled by a second process, or destination process.

Such an interprocess communication approach is inefficient for several reasons, including but not limited to the following. First, such an interprocess communication approach increases the memory storage and bandwidth requirements of the multi-process device by requiring that data passed in interprocess communications be stored more than once. Second, the process of copying interprocess communication data from a first location to a second location requires processing and/or bus clock cycles that could otherwise be used for other purposes. Increasing the memory size and bandwidth requirements of a multi-process device increases the space and power requirements of the multi-process device. Further, increasing the processing cycles for the multi-process device to perform a task requires that, for time critical processes, the clock-speed of the multi-process device must be increased, thereby increasing the complexity and/or the power requirements of the multi-process device.

Further, current interprocess communication techniques rely on the respective processes in a multi-process device to self-manage their respective shared memory usage and do not provide enforcement mechanisms that prevent one process from overwriting or freeing memory belonging to, and in use by, another process. As a result, if one or more processes within a multi-process device do not properly self-manage their respective memory usage, the entire multi-process device may become unstable. In addition, such problems are difficult to detect and isolate.

SUMMARY

In accordance with a described interprocess communication approach, a described interprocess memory controller may be used to provide multiple processes within a multi-process device with access to a shared physical memory. Further, the described interprocess memory controller may be used to provide efficient interprocess communication between the respective multiple processes. The processes serviced by the described interprocess memory controller may be executed by a single hardware processor or executed by multiple hardware processors within the multi-process device.

The described interprocess memory controller may enforce access rights to shared memory that has been allocated to the respective processes, thereby guarding the multi-process device from instability due to the unauthorized overwriting and/or unauthorized freeing of allocated memory.

The described interprocess memory controller approach may streamline interprocess communication by allowing data associated with an interprocess communication to be passed from a first process to a second process by passing a pointer to a buffer in shared memory that contains the message data. In this manner, the described interprocess memory controller approach may avoid the inefficiency of interprocess communication approaches that copy message data from a shared memory controlled by a first process to a shared memory controlled by a second process.

The described interprocess memory controller may maintain a set of permissions for each buffer allocated from shared memory by the respective processes in a multi-process device. For example, when a process allocates a buffer from the shared memory, the described interprocess memory controller may allocate permission to write to, and to free, the allocated buffer to the allocating process. Such allocated permissions may be stored by the described interprocess memory controller, in association with the allocated buffer, in physical memory. When a pointer to a buffer is passed, or transferred, from a first process, i.e., the sending process, to a second process, i.e., the receiving process, as part of an interprocess communication, the described interprocess memory controller may reallocate permission to write to, and to free, the allocated buffer to the receiving process by updating the buffer's permission data stored in physical memory. In this manner, the efficiency of interprocess communication is greatly increased and the integrity of the shared memory is maintained.

The described interprocess memory controller may enforce the permissions associated with the respective buffers allocated from shared memory. For example, if the memory controller receives a request from a process to write to an identified location in memory, or a request to free one or more buffers, the memory controller may verify whether the requesting process is authorized to make such a request. If the permissions stored by the memory controller indicate that the process has authority for the request, the request will be granted by the memory controller, otherwise, the request may be denied by the memory controller.

The described interprocess memory controller may be implemented in hardware and may communicate with one or more processes via an application programming interface. In one example of an embodiment of the described interprocess memory controller, the application programming interface may include at least three commands. An ALLOCATE command may be used by a process to allocate control over one or more buffers from the shared memory. A TRANSFER command may be used by a first process, with control over a buffer, to transfer control of the buffer to a second process. A FREE command may be used by a process, with control over one or more buffers to free the buffers for re-allocation by any one of the processes executed by the multi-process device.

The described interprocess memory controller may implement the above-described application programming interface using a combination of registers and lists. For example, a command register and a command list may be maintained to receive and control the execution of commands received from a process. Commands received from a process pertaining to a specific buffer may be held in the command list until processed by the described interprocess memory controller. Further, a status register and a status list may be maintained to receive and control the transfer of status updates from the described interprocess memory controller to the process. Status updates generated by the described interprocess memory controller may be held in the status list until processed by the process to which the buffer is assigned.

As described in greater detail below, the command/status register/list approach allows for efficient execution of the described interprocess memory controller application programming interface. The command/status register/list approach provides a store-and-forward structure that allows the respective processes and the described interprocess memory controller to operate efficiently. For example, neither the described interprocess memory controller or the processes within a multi-process device waste valuable processing cycles waiting for a command or a status update from each other, respectively. In one example of the described interprocess memory controller, when the memory controller is ready to process additional commands, the memory controller may read multiple commands from a command list with a single read from shared memory, thereby greatly reducing the overhead associated with the implementation of commands. Similarly, when a process is ready to write additional status updates, the process may write multiple status updates in a status list with a single burst write to shared memory, thereby greatly reducing the overhead associated with the writing of status updates.

The described interprocess memory controller may allow processes to allocate virtual buffers. A virtual buffer may include one or more physical memory buffers, or physical buffers, allocated from a shared memory. For example, if a physical buffer of size 256 bytes is used, and eight physical buffers are included in a virtual buffer, a virtual buffer of 2K bytes is achieved; if a physical buffer of size 512 bytes is used, and eight physical buffers are included in a virtual buffer, a virtual buffer of 4K bytes is achieved; if a physical buffer of size 1K bytes is used, and eight physical buffers are included in a virtual buffer, a virtual buffer of 8K bytes is achieved; and if a physical buffer of size 2K bytes is used, and eight physical buffers are included in a virtual buffer, a virtual buffer of 16K bytes is achieved.

The use of virtual buffers provides the described interprocess memory controller with greater flexibility to meet the memory storage requirements of the respective processes executed by a multi-process device. For example, assuming that 16-bit virtual buffer pointers are used, assuming the above constraints with respect to physical buffer sizes and the number of physical buffers included in a virtual buffer, such a virtual buffer approach allows the described interprocess memory controller to manage up to 1 Gigabyte of shared physical memory, for use in providing processes with enforced access controls and efficient interprocess communication services.

An example of a first embodiment may be a multi-process device that includes, at least one integrated circuit processor that supports concurrent execution of multiple computing processes, a physical memory that is shared by the multiple computing processes and a memory controller that controls access by the multiple computing processes to the shared physical memory. The memory controller may include a memory allocation unit that allocates at least one physical buffer for use by a first computing process of the multiple computing processes and updates a portion of the at least one physical buffer to include an identifier that identifies the first computing process.

An example of a second embodiment may be a method of controlling access to portions of a physical memory shared among a plurality of computing processes executing on at least one integrated circuit processor. The method may include allocating at least one physical buffer for use by a first computing process of the plurality of computing processes, updating a portion of the at least one physical buffer to store an identifier that identifies the first computing process, and denying write access to the at least one physical buffer to any computing process with an identifier that does not match the identifier stored in the at least one physical buffer.

An example of a third embodiment may be a memory controller that includes a command list control unit that receives and stores commands received from a plurality of processes executing on one or more of a plurality of integrated circuit processors within a multi-process device, and a memory interface unit that retrieves and executes commands from the command list control unit to control allocation of a physical memory buffer from a physical memory, execution of at least one of the commands resulting in a change of a status parameter portion of the physical memory buffer that controls access to the physical memory buffer by the plurality of processes.

BRIEF DESCRIPTION OF THE DRAWINGS

Examples of embodiments of a method and apparatus that supports efficient, reliable multi-process memory management and efficient interprocess communication will be described with reference to the following drawings, wherein like numerals designate like elements, and wherein:

FIG. 5 is a block diagram of an example of a memory interface unit shown in

FIG. 1;

DETAILED DESCRIPTION OF EMBODIMENTS

Figure 1:
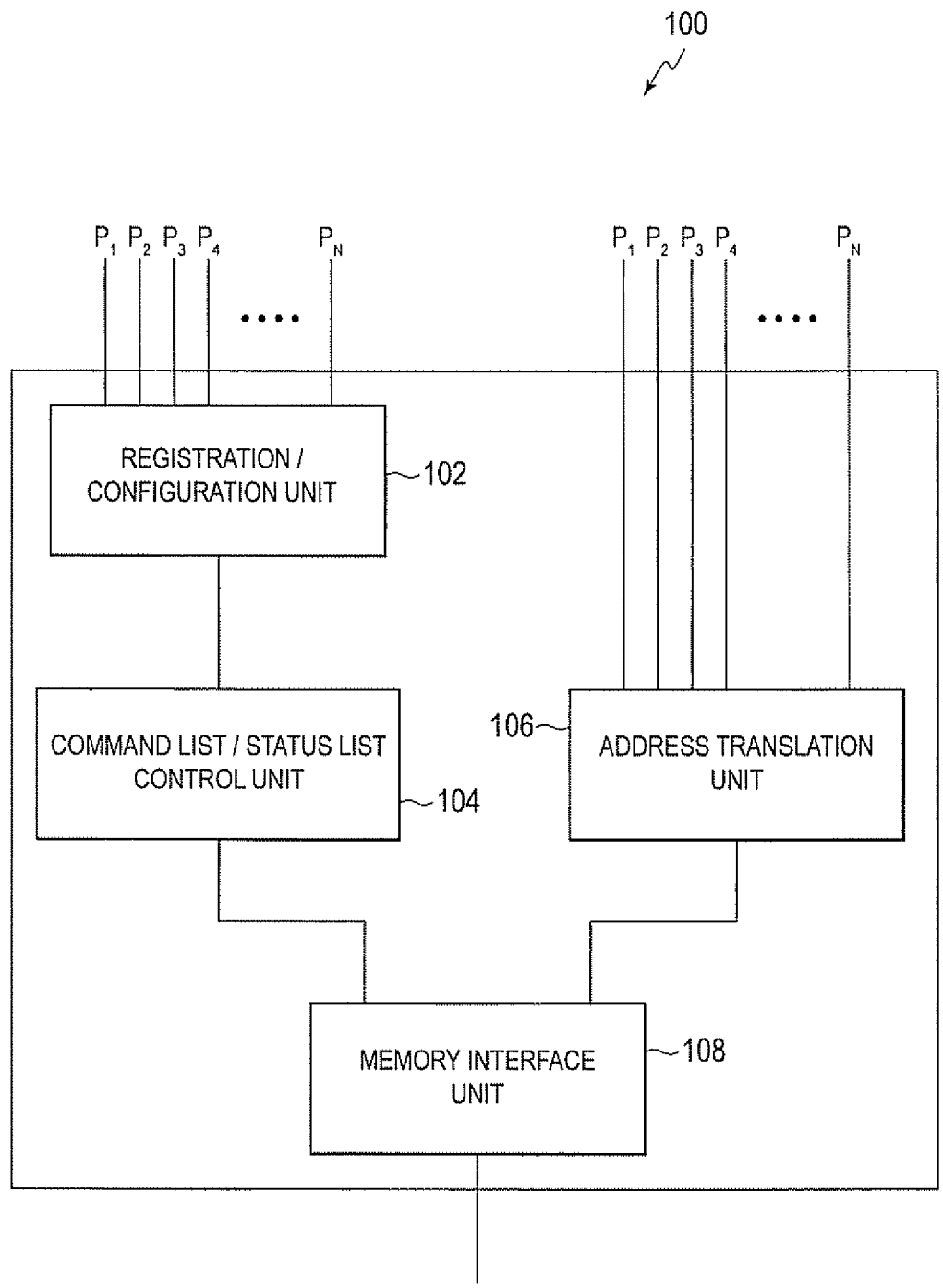
FIG. 1 is a system level block diagram of an example of an interprocess memory controller that supports efficient, reliable multi-process memory management and efficient interprocess communication.

FIG. 1 is a system level block diagram of an example of an interprocess memory controller that supports efficient, reliable multi-process memory management and efficient interprocess communication. As shown in FIG. 1, an example of an embodiment of the described interprocess memory controller 100 may include, a registration/configuration unit 102; a command-list/status-list control unit 104; an address translation unit 106; and a memory interface unit 108.

Registration/configuration unit 102 may manage registers associated with an application programming interface between interprocess memory controller 100 and the respective processes of a multi-process device. For example, as shown in FIG. 1 at $P_1$ through $P_N$, registration/configuration unit 102 may communicate with one or more processes executed by a multi-process device via a predefined application programming interface. The application programming interface may be implemented using a combination of command/status registers and command/status lists. As the interface between memory controller 102 and the respective processes of a multi-process device, registration/configuration unit 102 may maintain, within the described interprocess memory controller, a command list register and a status list register for a process executed by a multi-process device. The command/status registers maintained by registration/configuration unit 102 may be used to control access to the respective command/status lists. Both the command/status registers and command/status lists are described in greater detail below with respect to FIG. 9 and FIG. 10. Additional details related to an example of an embodiment of registration/configuration unit 102 are described below with respect to FIG. 2.

Command-list/status-list control unit 104 may manage command-lists/status-lists associated with a process. For example, interprocess memory controller 100 may receive multiple commands from a process directed to an identified buffer controlled by the process. As described in greater detail with respect to FIG. 9, below, command-list/status-list control unit 104 may allocate command list buffers, as needed, to store commands received from the controlling process for transfer to memory interface unit 108. Further, in response to the execution, and/or attempted execution, of commands, interprocess memory controller 100 may generate status updates for transfer to a process. As described in greater detail with respect to FIG. 10, below, command-list/status-list control unit 104 may allocate status list buffers, as needed, to store status updates for transfer to the controlling process. Additional details related to an example of an embodiment of command-list/status-list control unit 104 are described below with respect to FIG. 3.

Interprocess memory controller 100 may allow processes to allocate virtual buffers. A virtual buffer may include one or more physical memory buffers, or physical buffers, allocated from a shared memory. One example of a virtual buffer embodiment may be comprised of eight physical buffers, as described below with respect to FIG. 11 and FIG. 12. Address translation unit 106 may receive read/write/update requests from a process and, based on the nature of the buffer identified and/or the memory addresses specified in the read/write/update request, may perform a translation of a virtual memory address to one or more physical memory addresses. Once the memory addresses associated with a read/write/update request have been translated, i.e., assuming such translation is required, the read/write/update request may be passed to memory interface unit 108 for execution. Additional details related to an example of an embodiment of address translation unit 106 are described below with respect to FIG. 4.

Memory interface unit 108 provides interprocess memory controller 100 with an interface for communicating directly with a physical memory, e.g., standard SDRAM, DDR- SDRAM, SRAM, etc., controller. Additional details related to an example of an embodiment of memory interface unit 108 are described below with respect to FIG. 5.

Figure 2:
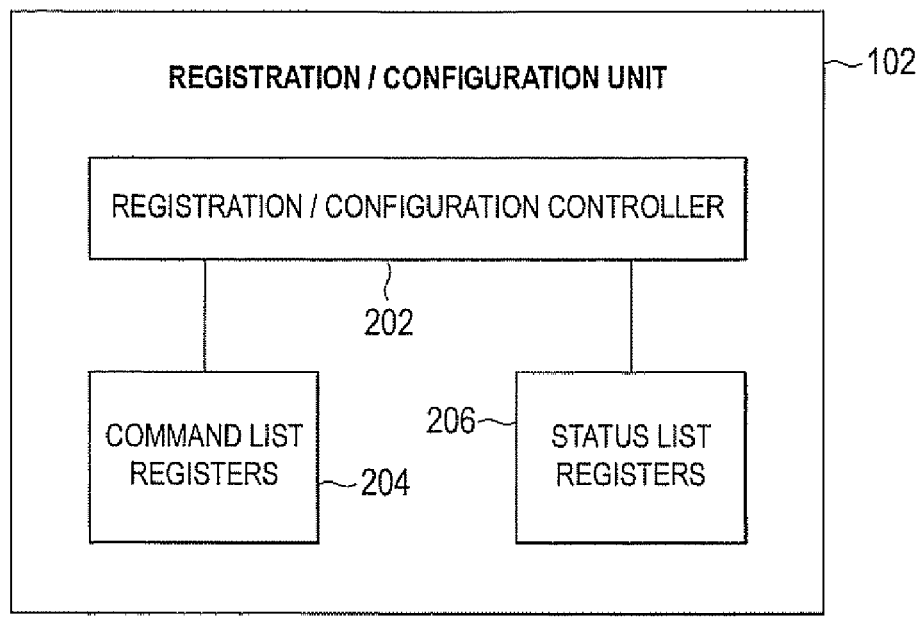
FIG. 2 is a block diagram of an example of a registration/configuration unit shown in FIG. 1.

FIG. 2 is a block diagram of an example of an embodiment of registration/configuration unit 102 introduced with respect to FIG. 1. As shown in FIG. 2, registration/configuration unit 102 may include a registration/configuration controller 202, command list registers 204 and status list registers 206. Registration/configuration controller 202 may be responsible for controlling the overall response of registration/configuration unit 102 in response to application programming interface commands received from individual processes executed by a multi-process device. For example, upon receipt of a command from a process, registration/configuration unit 102 may verify that the command is valid and may pass valid commands on to command-list/status-list control unit 104 for execution. Further, in response to a valid ALLOCATE command, registration/configuration controller 202 may add a new command list entry to command list registers 204, may add a new status list entry to status list registers 206, and may pass the ALLOCATE command on to command-list/status-list control unit 104 for execution. In response to a valid FREE command, registration/configuration controller 202 may pass the FREE command on to command-list/status-list control unit 104 for execution, and upon receiving an indication from command-list/status-list control unit 104 that the corresponding command/status lists associated with the freed buffer have been released, registration/configuration controller 202 may free the corresponding control list/status list registers. In response to a valid TRANSFER command, registration/configuration controller 202 may pass the command on to command-list/status-list control unit 104 for execution, and upon receiving an indication from command-list/status-list control unit 104 that the corresponding buffer has been transferred, registration/configuration controller 202 may update the corresponding register to reflect the new process controlling the associated buffer.

Further, registration/configuration controller 202 may maintain statistics related to the number and size of command/status lists maintained. For example, if the number and/or size of the respective command/status lists exceed one or more predetermined thresholds, registration/configuration controller 202 may deny further allocation commands until the number and/or size of the respective command/status lists drops below the respective one or more predetermined thresholds. In addition, example embodiments of registration/configuration controller 202 may maintain a unique buffer identifier and a unique process identifier in each control/status register. If the process identifier of a process issuing a command that affects an identified buffer does not match the process identifier associated with the buffer identifier in the command/status registers, the command may be found invalid and registration/configuration controller 202 may request command-list/status-list control unit 104 to add a status update to the status list indicating that the received command was ignored and the status lists register may be updated to reflect entry of the new status update.

Figure 3:
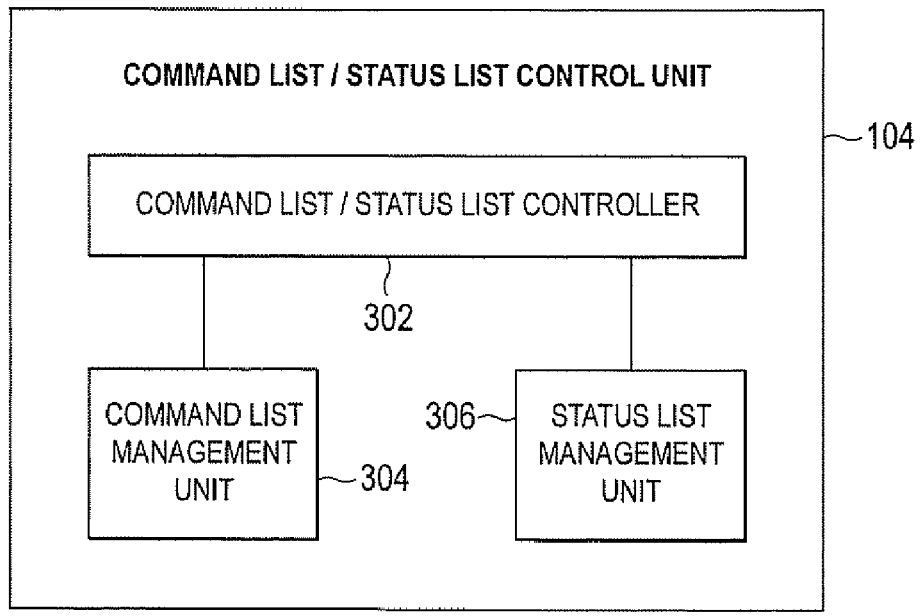
FIG. 3 is a block diagram of an example of a command-list/status-list control unit shown in FIG. 1.

FIG. 3 is a block diagram of an example of an embodiment of command-list/status-list control unit 104 introduced with respect to FIG. 1. As shown in FIG. 3, command-list/status-list control unit 104 may include a command-list/status-list controller 302, a command list management unit 304 and a status list management unit 306. Command-list/status-list controller 302 may be responsible for controlling the overall response of command-list/status-list control unit 104 in response to communication from registration/configuration unit 102 and memory interface unit 108. For example, in response to a ALLOCATE command from registration/configuration unit 102, command-list/status-list controller 302 may instruct command list management unit 304 to allocate a new command list buffer from shared memory via memory interface unit 108 and may instruct status list management unit 306 to allocate a new status list buffer from shared memory via memory interface unit 108. Upon receiving from command list management unit 304 an indication that the new command list has been allocated, command-list/status-list controller 302 may instruct command list management module 304 to insert the ALLOCATE command into the command list and may provide registration/configuration unit 102 with command list pointer and offset information, as described in greater detail with respect to FIG. 9. Further, upon receiving an indication from memory interface unit 108 that a status update has been generated, command-list/status-list controller 302 may instruct status list management module 306 to insert the status update into the status list and may provide registration/configuration unit 102 with status list pointer and offset information, as described in greater detail with respect to FIG. 10.

Figure 4:
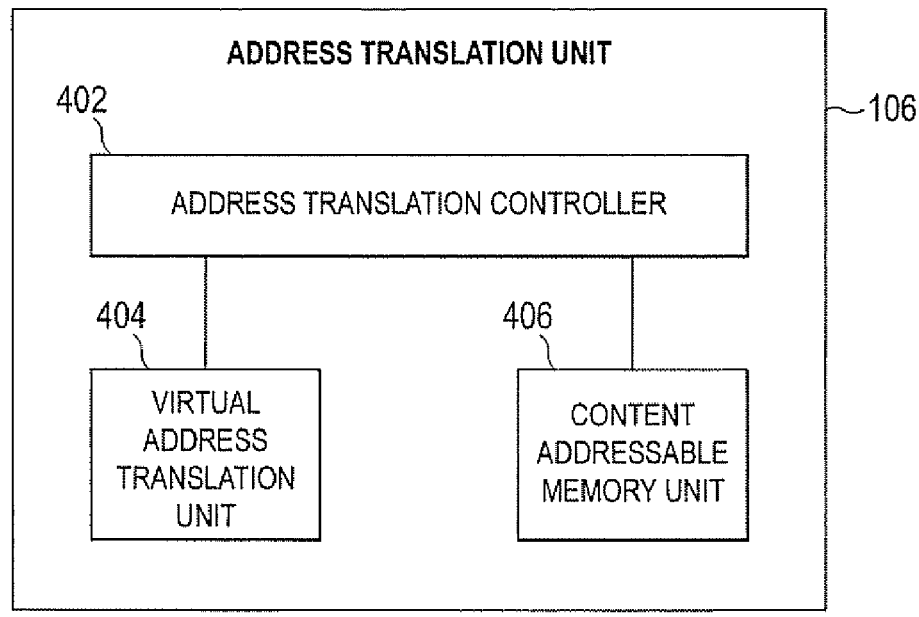
FIG. 4 is a block diagram of an example of an address translation unit shown in FIG. 1.

FIG. 4 is a block diagram of an example of an embodiment of address translation unit 106 introduced with respect to FIG. 1. As shown in FIG. 4, address translation unit 106 may include an address translation controller 402, a virtual address translation unit 404 and a content addressable memory unit 406. Address translation controller 402 may be responsible for controlling the overall response of address translation unit 106 in response, for example, to a read/write request from a process. For example, upon receipt of a read/write request from a process, address translation controller 402 may examine the address associated with the request to determine whether or not the associated memory addresses are virtual memory addresses. If a memory address associated with the request is determined to be a virtual memory address, address translation controller 402 may submit the virtual address to virtual translation unit 404 for conversion to a physical address. If address translation controller 402 determines that all the addresses associated with the request are physical addresses, or if address translation controller 402 determines that all virtual addresses associated with a request have been translated to physical addresses, the request may be forwarded to memory interface unit 108 for processing.

In one example of an embodiment of address translation unit 106, virtual address translation unit 404 may have access to a content addressable memory (CAM) that stores the translated physical address associated with the most recently accessed virtual addresses. If the virtual address translation unit locates a virtual address in CAM, translation of the virtual address requires merely retrieving from CAM the physical address stored in association with the virtual address.

Such an embodiment may include a content addressable memory unit 406 that continuously updates the CAM to drop least recently used virtual addresses from the CAM, thereby retaining in CAM the most recently accessed, and the most repeatedly accessed virtual memory addresses. For example, in one such embodiment, the CAM may retain, for example, 16 entries. When a new virtual address is translated, the virtual address and its corresponding physical address may be added to the CAM, and the least recently used virtual address may be dropped from the CAM. To determine which CAM element to drop, content addressable memory unit 406 may maintain a 4-bit counter for each CAM entry that is incremented on an access. Whenever a count gets to 0xF, i.e., 15, all the respective counters may be divided by 2, i.e., shifted right insert 0. When inserting a new virtual address into the CAM, content addressable memory unit 406 may overwrite the CAM entry with the lowest counter. In the case of a tie, content addressable memory unit 406 may overwrite the lowest numbered entry in the CAM with the lowest counter. The size of the CAM should be large enough to hold the number of virtual buffers that may be accessed by active processes.

The above described CAM approach assumes that once a virtual address is used a first time, there is a strong likelihood that the virtual address will again be used in the near future. Such an assumption is a good assumption, for example, in the case of a TRANSFER command in which a first process may write to a virtual address buffer and initiate an interprocess communication to another process using a TRANSFER command. Upon receiving a status update notifying the receiving process of the TRANSFER, the receiving process is likely to attempt to read the buffer at the virtual address. Therefore, by storing recently used virtual address translations in virtual memory, the processing cycles required by virtual address translation unit 404 to translate virtual addresses may be reduced. There is however, no requirement that the shared memory appear in the same address space by different processors.

Figure 5:
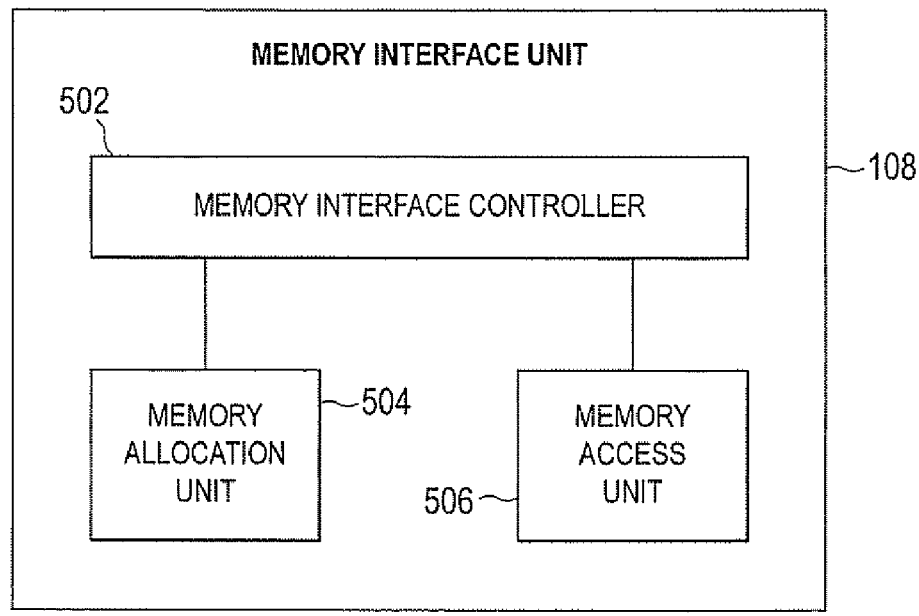

FIG. 5 is a block diagram of an example of an embodiment of memory interface unit 108 introduced with respect to FIG. 1. As shown in FIG. 5, memory interface unit 108 may include a memory interface controller 502, a memory allocation unit 504 and a memory access unit 506. Memory interface controller 502 may be responsible for controlling the overall response of memory interface unit 108 in response to commands received from command-list/status-list control unit 104 and address translation unit 106. Memory interface controller 502 may call on one or both of memory allocation unit 504 and memory access unit 506 in response to such commands.

Memory allocation unit 504 may allocate and maintain, and/or free, stacks that contain pointers to physical buffers associated with an allocated virtual buffer in response to commands retrieved from a command list associated with a new or existing virtual buffer. Further, memory allocation unit 504, may allocate and/or free buffers to hold command lists and/or status lists in response to requests from command list management unit 304 and status list management unit 306, respectively.

In one example of an embodiment of memory allocation unit 504, memory allocation unit 504 may maintain a cache of pointers that may be emptied to populate a new virtual buffer stack, e.g., in response to an ALLOCATE command, and that may be loaded with pointers to buffers freed from a virtual buffer in response to a FREE command. Further, memory allocation unit 504 may, in response to an ALLOCATE command allocate an initial command list buffer and an initial status list buffer that may be managed by command list management unit 304 and status list management unit 306, respectively. As described in greater detail with respect to FIG. 9 and FIG. 10, memory allocation unit 504 may allocate additional buffers to command lists and/or status lists, e.g., at the request of command list management unit 304 and status list management unit 306, as the respective command-lists/status-lists become full. Further, memory allocation unit 504 may free buffers from command lists and/or status lists, e.g., at the request of command list management unit 304 and status list management unit 306, as the respective command-lists/status-lists become empty.

Memory access unit 506 may provide an interface between memory interface unit 108 and a physical memory, e.g., standard SDRAM, DDR-SDRAM, SRAM, etc., controller. For example, upon receipt of a read/write/update request from address translation unit 106 containing, for example, an initial physical buffer pointer and range, memory access unit 506 may access the virtual buffer stacks maintained by memory allocation unit 504 to formulate and submit to the physical memory controller appropriate read, write, update and free commands in accordance with the request from address translation unit 106.

Further, upon retrieving a TRANSFER command from the command list maintained by command list management unit 304, memory access unit 506 may update the permission data stored, for example, in the virtual buffer header within buffer0 of the transferred virtual buffer to identify the receiving process as the process with control over the transferred virtual buffer. Header data that may be contained within the first bytes of buffer0 of a virtual buffer is addressed in greater detail with respect to FIG. 12. Further, upon completion of all tasks associated with an ALLOCATE, TRANSFER, or FREE command, by one of memory allocation unit 504 and memory access unit 506, memory interface controller 502 may submit an appropriate status update to command-list/status-list controller 104 indicating the status of the respective task.

Figure 6:
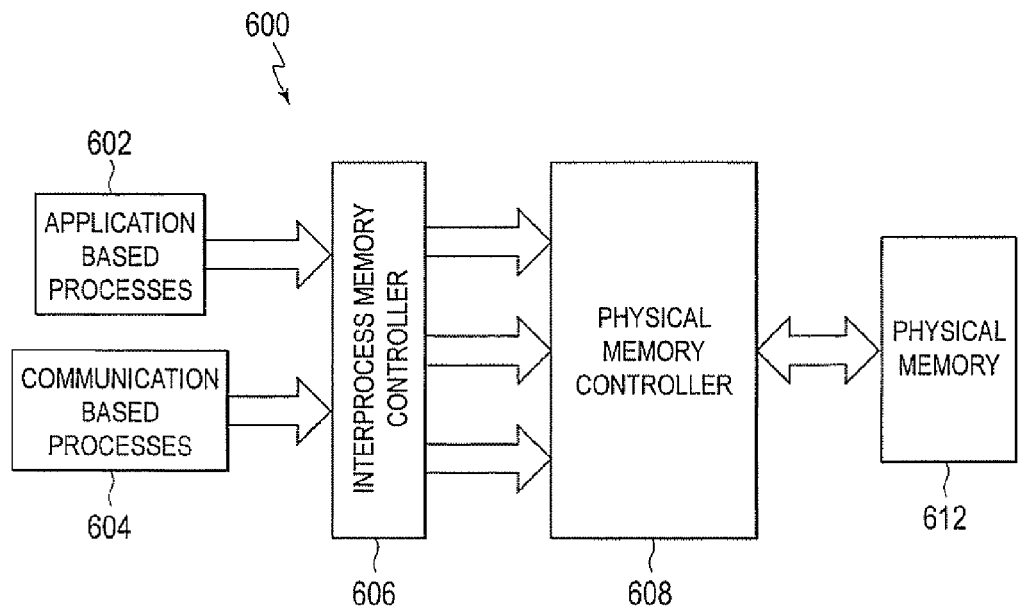
FIG. 6 is a schematic diagram of an example of a first embodiment of a multi-process device that supports efficient, reliable multi-process memory management and efficient interprocess communication using a first described interprocess memory controller embodiment.
Figure 7:
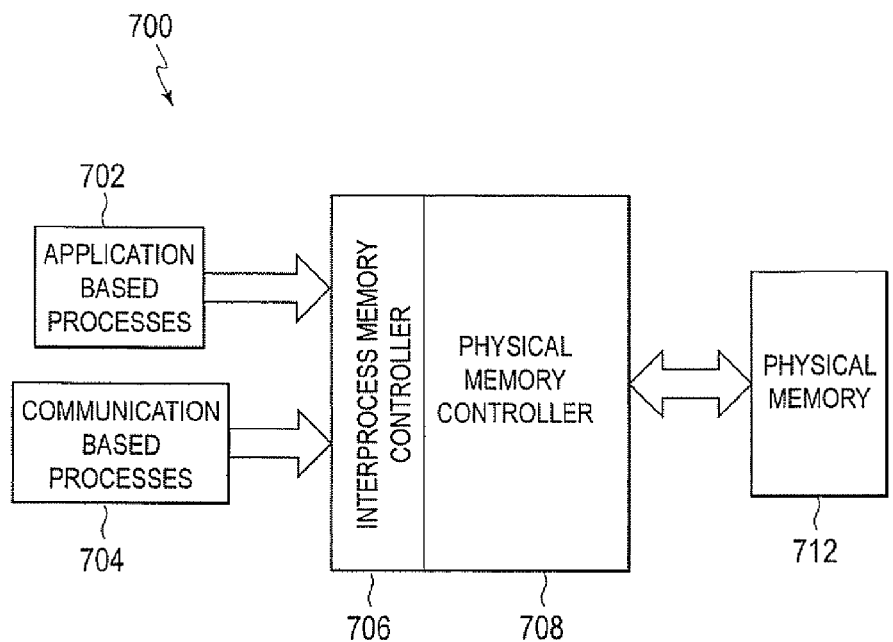
FIG. 7 is a schematic diagram of an example of a second embodiment of a multi-process device that supports efficient, reliable multi-process memory management and efficient interprocess communication using a second described interprocess memory controller embodiment.
Figure 8:
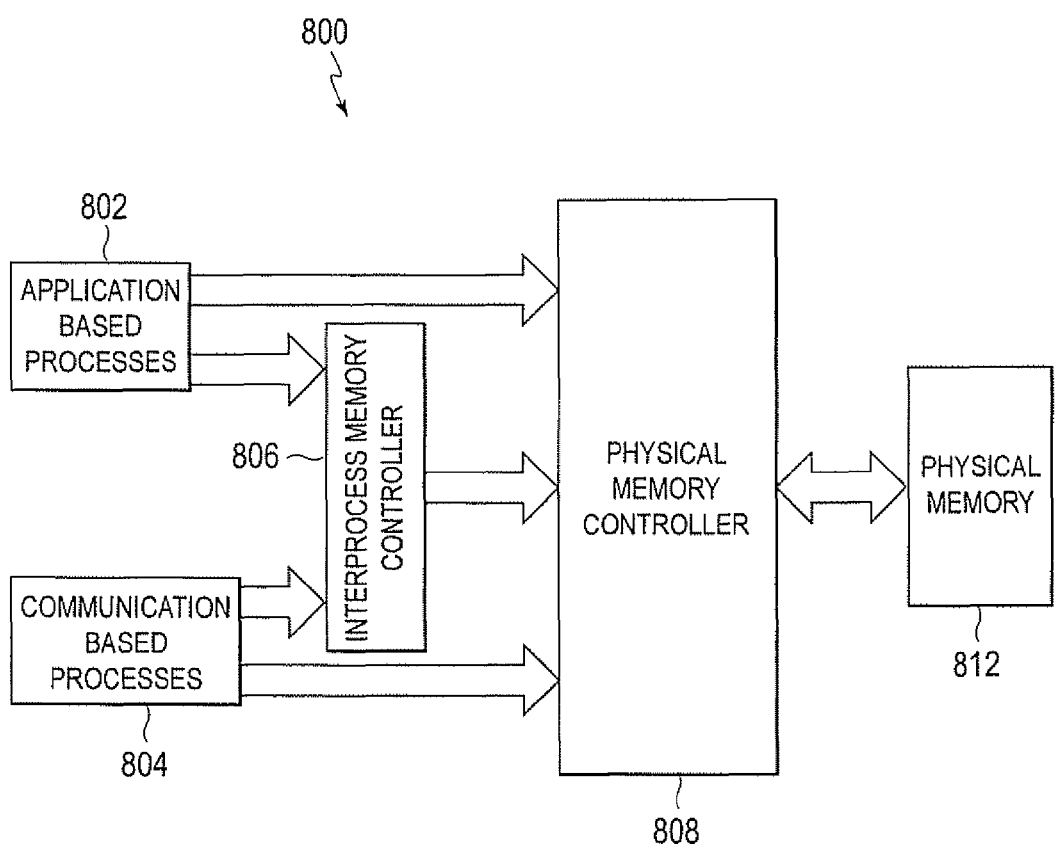
FIG. 8 is a schematic diagram of an example of a third embodiment of a multi-process device that supports efficient, reliable multi-process memory management and efficient interprocess communication using a third described interprocess memory controller embodiment.

FIG. 6, FIG. 7 and FIG. 8 present schematic diagrams of examples of embodiments of multi-process devices configured to support efficient, reliable multi-process memory management and efficient interprocess communication using examples of embodiments of the described interprocess memory controller. Please note that arrows between label elements in FIG. 6 through FIG. 8 represent a formally defined interface between respective elements. Further, please note that, in each of FIG. 6 through FIG. 8, like features are labeled with like numeric labels in which the first digit indicates a figure number. Therefore, as a matter of convention, a label of the format "X##," may be used in the description below to identify a corresponding element in each of the respective figures. In addition, please note that although the one or more application processes X02 and the one or more communication processes X04 are indicated as originating from separate hardware processors, the respective one or more processes may originate from a common hardware processor. Further, the use of the term application processes and communication processes are exemplary only and that the respective one or more processes may be associated with any number of one or more process types and/or any number of one or more processors.

FIG. 6 is a schematic diagram of an example of a first embodiment of a multi-process device that supports efficient, reliable multi-process memory management and efficient interprocess communication using a first described interprocess memory controller embodiment. As shown in FIG. 6, in such an embodiment, interprocess memory controller 606 may be implemented as a separate unit from physical memory controller 608. In such an embodiment, all access between processes 602 and processes 604 and physical memory 612 may be based on a formal interface between the respective processes and interprocess memory controller 606. Further, all communication between interprocess controller 606 and physical memory controller 608 may be based on a formal interface.

FIG. 7 is a schematic diagram of an example of a second embodiment of a multi-process device that supports efficient, reliable multi-process memory management and efficient interprocess communication using a second described interprocess memory controller embodiment. As shown in FIG. 7, in such an embodiment, interprocess memory controller 706 may be implemented as an integrated unit with physical memory controller 708. In such an embodiment, all access between processes 602 and processes 604 and physical memory 612 is, again, based on a formal interface between the respective processes and interprocess memory controller 706, however, the interface between interprocess memory controller 706 and physical memory controller 708 is transparent.

FIG. 8 is a schematic diagram of an example of a third embodiment of a multi-process device that supports efficient, reliable multi-process memory management and efficient interprocess communication using a third described interprocess memory controller embodiment. The embodiment shown in FIG. 8 is similar to the embodiment shown in FIG. 6 in that interprocess memory controller 806 is again implemented as a separate unit from physical memory controller 808. However, as shown in FIG. 8, communication between processes 802 and processes 804 may communicate directly with physical memory controller 808 to access physical memory 812. Although such direct access may bypass the enforcement of access controls provided by interprocess controller 806, such direct access may be useful for memory accesses that are unlikely to destabilize the multi-process device and/or applications that do not require interprocess communication. In such a manner, interprocess controller 806 may be freed to support more processes that require interprocess communication and/or enforcement of access controls.

Figure 9:
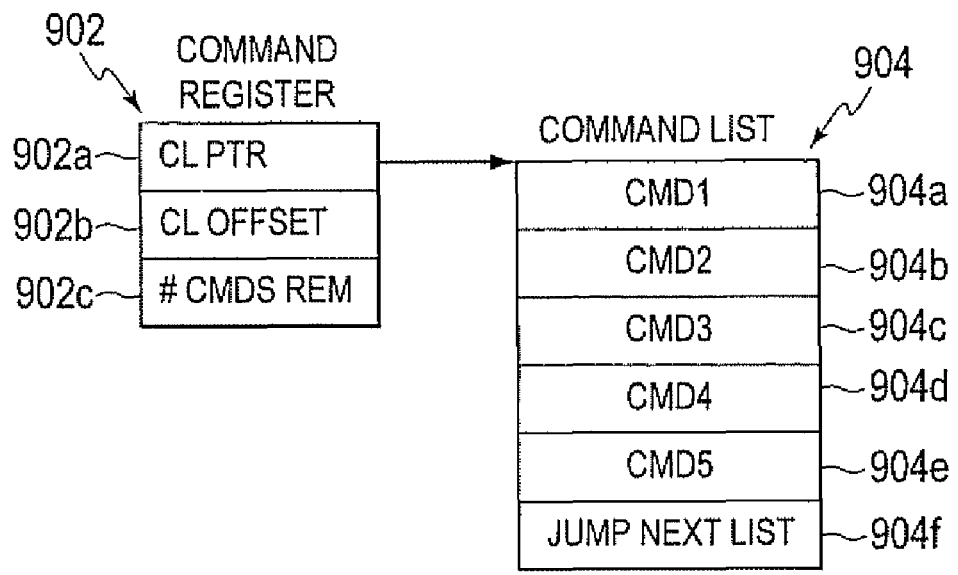
FIG. 9 is a data structure diagram of an example of a command list register and corresponding command list.

FIG. 9 is a data structure diagram of an example of a command list register and corresponding command list as may be maintained by registration/configuration unit 102 and command-list/status-list control unit 104, as described above with respect to FIG. 2 and FIG. 3, respectively. As shown in FIG. 9, registration/configuration unit 102 may maintain a command register 902 for each command list 904. One example of an embodiment of a command register 902 may include: a pointer 902a to the start of a command list 904; an offset 902b that, when added to the pointer stored at 902a, may point to one of a start of a last command added to command list 904, i.e., represented in FIG. 9 at one of 904a through 904e, and a start of a pointer, e.g., as shown at 904f, that may point to a next command list buffer 904 in a chain of command list buffers; and a count 902c of a number of remaining free command entries available in command list 904. In another example of an embodiment of a command register 902, command register 902 may further include: a unique identifier of a process that owns the virtual buffer associated with the command register; and a unique identifier of the allocated virtual buffer associated with the command register.

As described above with respect to FIG. 5, a command list may be stored in a command list buffer allocated by memory allocation unit 504 for use by command list management unit 304. The command list may be used to store commands from software to hardware, such as commands related to the allocation, transfer and/or freeing of a virtual buffer, prior to execution by memory interface unit 108. Should the number of received commands exceed the number of storage locations provided by a command list, an additional command list buffer may be allocated and a pointer to the new command list buffer may be inserted at the last pointer storage location of the previous command list buffer, i.e., position 904f in FIG. 9, that points to the start of the subsequent command list buffer.

For example, in one example embodiment of interprocess memory controller 100, registration/configuration controller 202 may monitor count 902c of a number of remaining free command entries available in a command list. Upon detecting that the number of remaining free command list entries has dropped below a predetermined threshold, registration/configuration controller 202 may inform command-list/status-list controller 302 of the condition. In response, command-list/status-list controller 302 may instruct command list management unit 304 to request an additional command list buffer via memory interface unit 108.

Figure 10:
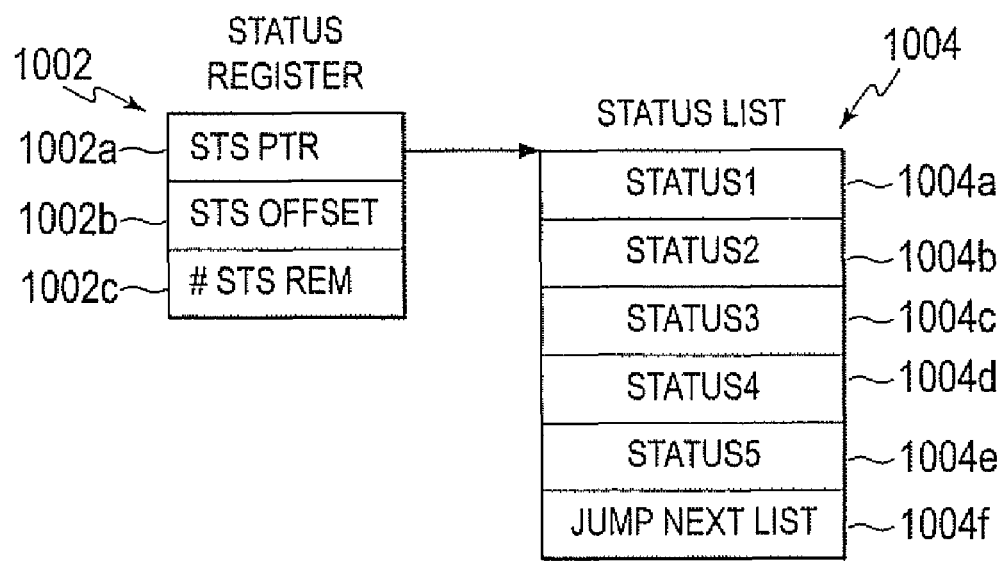
FIG. 10 is a data structure diagram of an example of a status list register and corresponding status list.

FIG. 10 is a data structure diagram of an example of a status list register and corresponding status list as may be maintained by registration/configuration unit 102 and command-list/status-list control unit 104, as described above with respect to FIG. 2 and FIG. 3, respectively. As shown in FIG. 10, registration/configuration unit 102 may maintain a status register 1002 for each status list 1004. One example of an embodiment of a status register 1002 may include: a pointer 1002a to the start of a status list 1004; an offset 1002b that, when added to the pointer stored at 1002a, may point to one of a start of a last status update added to status list 1004, i.e., represented in FIG. 10 at one of 1004a through 1004e, and a start of a pointer, e.g., as shown at 1004f, that may point to a next status list buffer 1004 in a chain of status list buffers; and a count 1002c of a number of remaining free status entries available in status list 1004. In another example of an embodiment of a status register 1002, status register 1002 may further include: a unique identifier of a process that owns the virtual buffer associated with the status register; and a unique identifier of the allocated virtual buffer associated with the status register.

As described above with respect to FIG. 5, a status list may be stored in a status list buffer allocated by memory allocation unit 504 for use by status list management unit 306. The status list may be used to store status updates from hardware to software, such as updates related to the allocation, transfer and/or freeing of a virtual buffer, following execution and/or attempted execution by memory interface unit 108. Should the number of received status updates exceed the number of storage locations provided by a status list, an additional status list buffer may be allocated and a pointer to the new status list buffer may be inserted at the last pointer storage location of the previous status list buffer, i.e., position 1004f in FIG. 10, that points to the start of the subsequent status list buffer.

For example, in one example embodiment of interprocess memory controller 100, registration/configuration controller 202 may monitor count 1002c of a number of remaining free status entries available in a status list. Upon detecting that the number of remaining free status list entries has dropped below a predetermined threshold, registration/configuration controller 202 may inform command-list/status-list controller 302 of the condition. In response, command-list/status-list controller 302 may instruct status list management unit 306 to request an additional status list buffer via memory interface unit 108.

Figure 11:
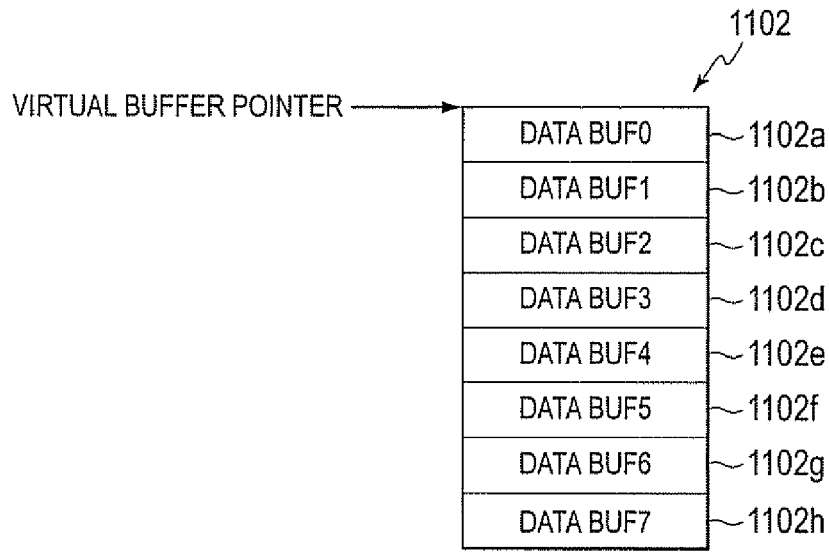
FIG. 11 is a data structure diagram of an example of a virtual buffer.

FIG. 11 is a data structure diagram of an example of a virtual buffer that may be allocated by memory interface unit 108 in response to an ALLOCATE command. As shown in FIG. 11, a virtual buffer 1102 may be represented as a stack of a predetermined number of pointers, e.g., eight, as shown in FIG. 11. Each pointer may store the location a physical buffer within shared physical memory. In this manner, the interprocess memory controller may allow processes to allocate pools of memory larger than could otherwise be allocated by the respective processes.

For example, if a physical buffer of size 256 bytes is used, and virtual buffer stack 1102 stores eight buffer pointers, a virtual buffer of 2K bytes is achieved; if a physical buffer of size 512 bytes is used, and virtual buffer stack 1102 stores eight buffer pointers, a virtual buffer of 4K bytes is achieved; if a physical buffer of size 1K bytes is used, and virtual buffer stack 1102 stores eight buffer pointers, a virtual buffer of 8K bytes is achieved; and if a physical buffer of size 2K bytes is used, and virtual buffer stack 1102 stores eight buffer pointers, a virtual buffer of 16K bytes is achieved.

Hence, the use of virtual buffers provides the interprocess memory controller with greater flexibility to meet the memory storage requirements of the respective processes executed by a multi-process device. For example, assuming that 16-bit virtual buffer pointers are used, assuming the above constraints with respect to physical buffer sizes and the size of a virtual buffer stack, such an approach allows interprocess memory controller to manage up to 1 Gigabyte of shared physical memory, for using in providing processes with enforced access controls and efficient interprocess communication services.

Figure 12:
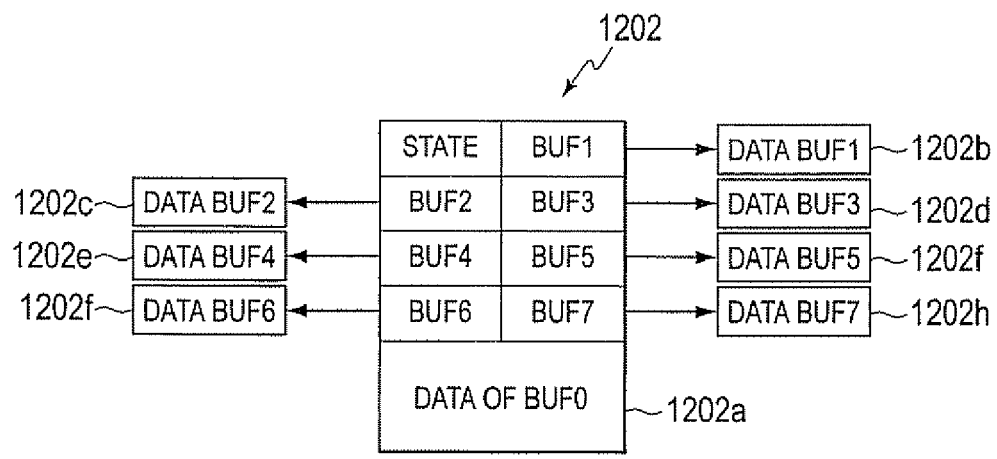
FIG. 12 is a data structure diagram of an example of a first physical buffer of the virtual buffer shown in FIG. 11.

FIG. 12 is a data structure diagram of an example of a first physical buffer, i.e., Buffer0, of the virtual buffer shown in FIG. 11. As shown in FIG. 12, in one exemplary embodiment, the first eight 16-bit words, i.e., 128 bytes, of Buffer0 may be reserved to hold a state of the virtual buffer, and pointers to the remaining 7 physical buffers associated with the virtual buffer. The state of the virtual buffer may be used to store a unique identifier of a process which controls, i.e., has write/transfer/free control over, the virtual buffer. This state, which may be stored in a physical buffer of an allocated virtual buffer, and which may identify a process which has write/transfer/free control over the allocated virtual buffer, may be used by the described interprocess memory controller to enforce interprocess access controls and to facilitate interprocess communication, as described above, and as described below with respect to FIG. 13 through FIG. 17.

Figure 13:
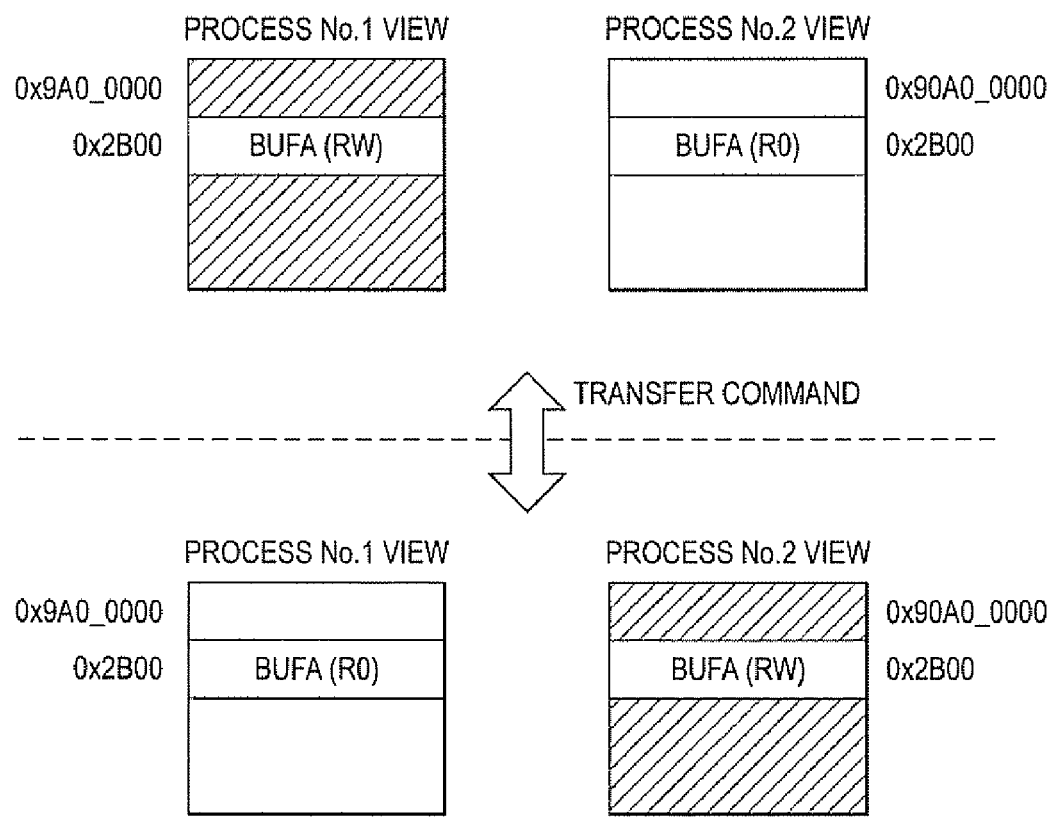
FIG. 13 is a diagram depicting the effect of an interprocess transfer command on a buffer transferred from a first process to a second process.

FIG. 13 is a diagram depicting the effect of an interprocess transfer command on a virtual buffer transferred from a first process to a second process. As shown in FIG. 13, prior to execution of an interprocess TRANSFER command, write control over a virtual buffer may be held by a first process, i.e., process #1, while a second process, i.e., process #2, has read-only access. However, after a TRANSFER command from process #1 to process #2 is executed, write control over a virtual buffer may be held by process #2, and process #1, has read-only access. As further shown in FIG. 13, the interprocess communication between process #1 and process #2 is implemented without moving or copying the contents of the transferred virtual buffer. Throughout the transfer process the virtual buffer remains at the same location in memory, i.e., at location 0x90A0_0000/0x2B00. In one exemplary embodiment, an interprocess communication may be implemented by updating the state of an allocated virtual buffer from a sending process to a receiving process, and inserting a status update in the status list associated with the allocated virtual buffer informing the receiving process of the transfer.

Figure 14:
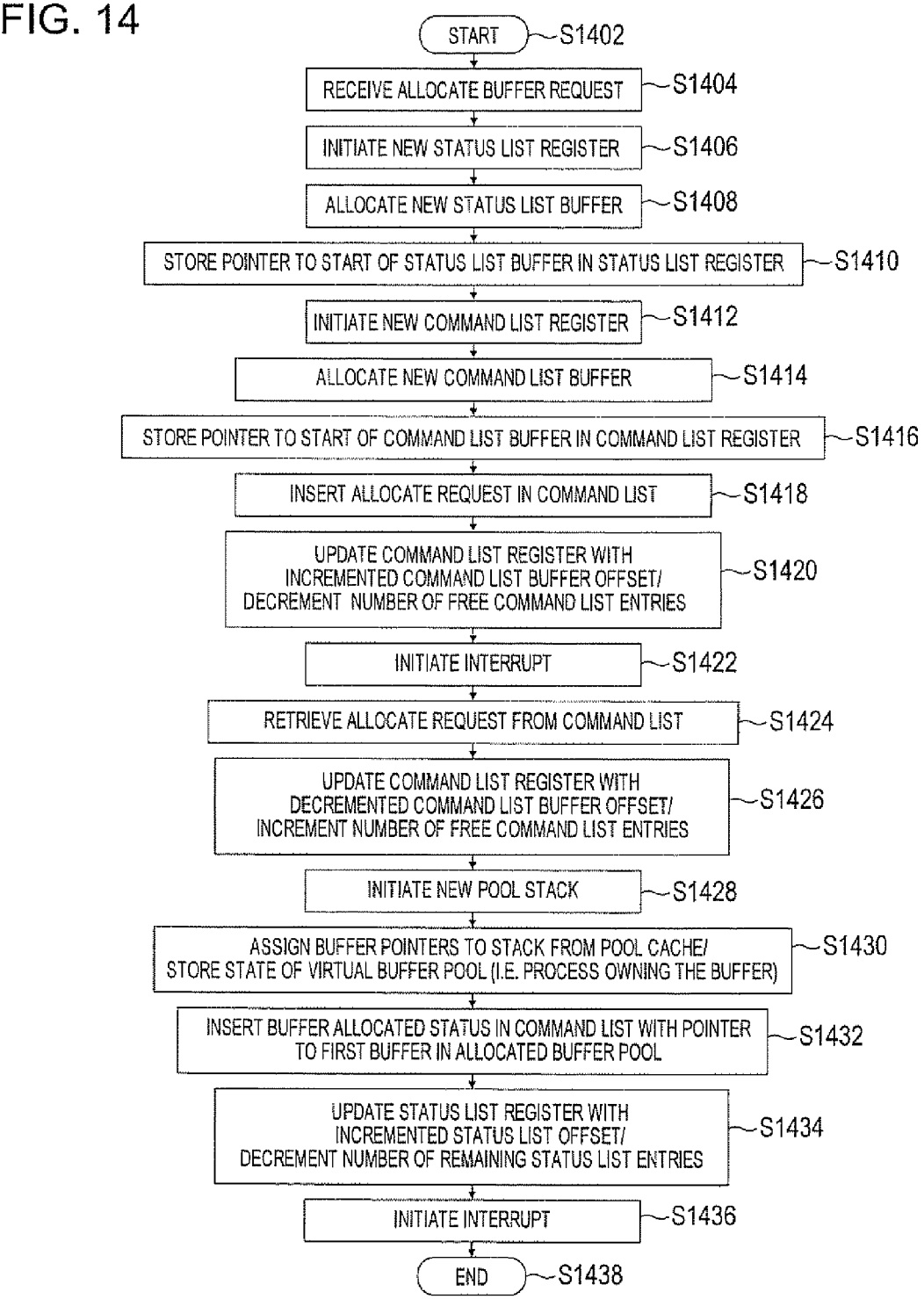
FIG. 14 is a flow diagram representing an example of a method for allocating a buffer using an example of the described interprocess memory controller.

FIG. 14 is a flow diagram representing an example of a method for allocating a virtual buffer using an example of the described interprocess memory controller. As shown in FIG. 14, operation of the method begins at step S1402 and proceeds to step S1404.

In step S1404, registration/configuration unit 102 may receive an ALLOCATE command from a processes executed by a multi-process device, and operation of the method continues to step S1406.

In step S1406, registration/configuration unit 102 may initiate a new status list register, and operation of the method continues to step S1408.

In step S1408, command-list/status-list control unit 104 may allocate a new status list buffer, and operation of the method continues to step S1410.

In step S1410, registration/configuration unit 102 may store a pointer to the start of the status buffer list allocated in step S1408 within the status list register initiated in step S1406, and operation of the method continues to step S1412.

In step S1412, registration/configuration unit 102 may initiate a new command list register, and operation of the method continues to step S1414.

In step S1414, command-list/status-list control unit 104 may allocate a new command list buffer, and operation of the method continues to step S1416.

In step S1416, registration/configuration unit 102 may store a pointer to the start of the command buffer list buffer allocated in step S1414 within the command list register initiated in step S1412, and operation of the method continues to step S1418.

In step S1418, command-list/status-list control unit 104 may insert an ALLOCATE command into the command list, and operation of the method continues to step S1420.

In step S1420, registration/configuration unit 102 may update the command list register with an incremented command list buffer offset and may decrement the count of remaining free command list entries, and operation of the method continues to step S1422.

In step S1422, registration/configuration controller 202 may initiate an interrupt, and operation of the method continues to step S1424.

In step S1424, memory interface unit 108 may retrieve the ALLOCATE command from the command list, and operation of the method continues to step S1426.

In step S1426, registration/configuration unit 102 may update the command list register with a decremented command list buffer offset and may increment the count of remaining free command list entries, and operation of the method continues to step S1428.

In step S1428, memory allocation unit 504 may initiate a new virtual buffer stack, and operation of the method continues to step S1430.

In step S1430, memory allocation unit 504 may assign buffer pointers to the virtual buffer stack initiated in step S1428, and may set the state of the virtual buffer to include the identity of the process that allocated, i.e., owns, the virtual buffer, and operation of the method continues to step S1432.

In step S1432, memory allocation unit 504 may insert a buffer-allocated status update within the status list with a pointer to the first buffer of the allocated virtual buffer, and operation of the method continues to step S1434.

In step S1434, registration/configuration unit 102 may update the status list register an incremented status list offset, and may decrement the number of remaining status list entries, and operation of the method continues to step S1436.

In step S1436, registration/configuration controller 202 may initiate an interrupt, and operation of the method continues to step S1438 and the process terminates.

Figure 15:
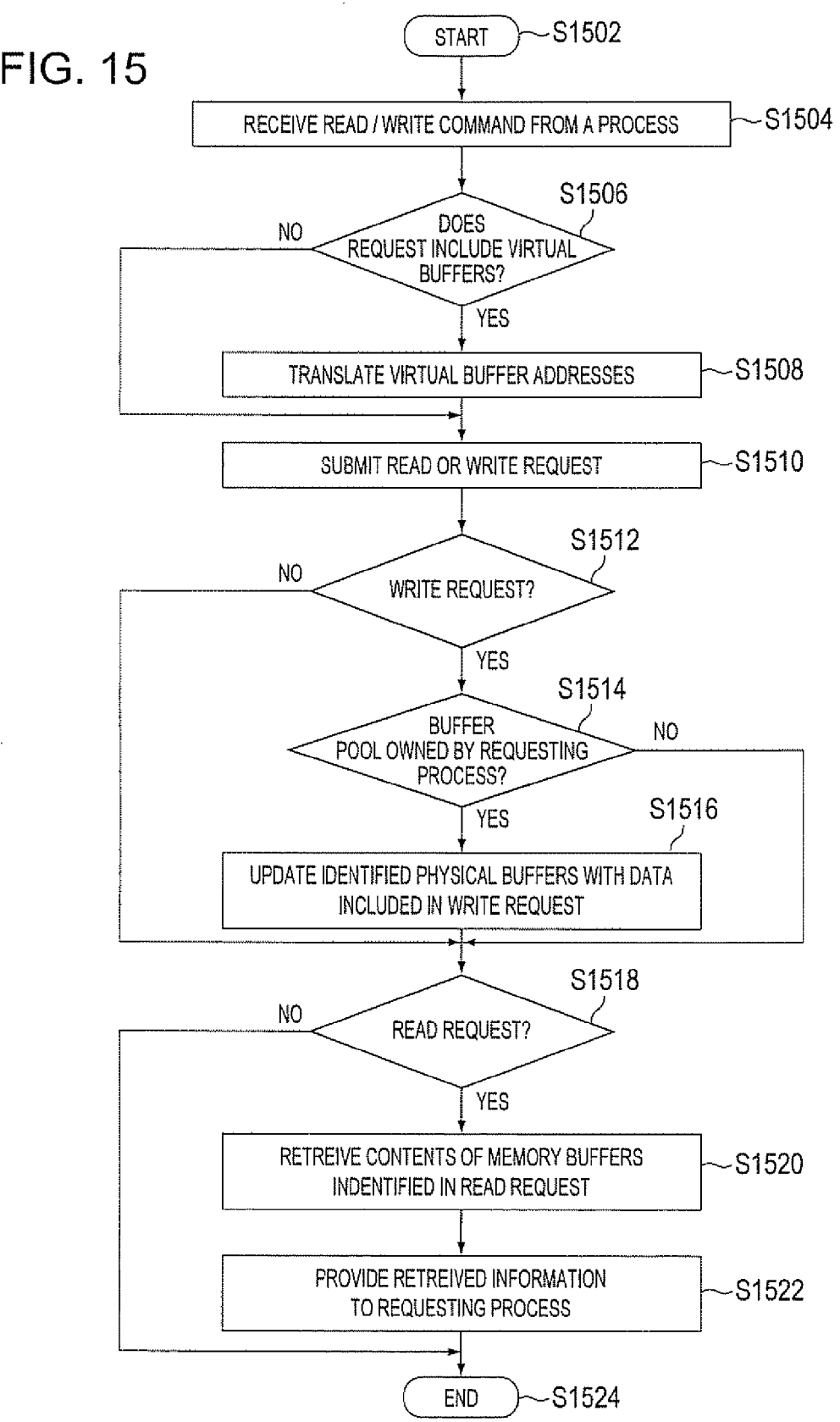
FIG. 15 is a flow diagram representing an example of a method for reading from or writing to a buffer using an example of the described interprocess memory controller.

FIG. 15 is a flow diagram representing an example of a method for reading from or writing to a virtual buffer using an example of the described interprocess memory controller. As shown in FIG. 15, operation of the method begins at step S1502 and proceeds to step S1504.

In step S1504, address translation unit 106 may receive one of a read or write request from a process executed by a multi-process device, and operation of the method continues to step S1506.

If, in step S1506, address translation unit 106 determines that the request includes virtual buffer addresses, operation of the method continues to step S1508, otherwise, operation of the method proceeds to step S1510.

In step S1508, address translation unit 106 may translate received virtual buffer pointers to physical buffer pointers, and operation of the method continues to step S1510.

In step S1510, address translation unit 106 may submit the read/write request to memory interface unit 108, and operation of the method continues to step S1512.

If, in step S1512, memory allocation unit 502 determines that the request is a write request, operation of the method continues to step S1514, otherwise, operation of the method proceeds to step S1518.

If, in step S1514, memory allocation unit 504 determines that the requesting process controls the virtual buffer to be written to, operation of the method continues to step S1516, otherwise, operation of the method proceeds to step S1518.

In step S1516, memory access unit 506 may write to the physical buffers of the virtual buffer with data provided in the request, and operation of the method continues to step S1518.

If, in step S1518, memory allocation unit 502 determines that the request is a read request, operation of the method continues to step S1520, otherwise, operation of the method proceeds to step S1524 and the process terminates.

In step S1520, memory access unit 506 may retrieve the contents of physical buffers of the virtual buffer identified by the read request, and operation of the method continues to step S1522.

In step S1522, the retrieved data may be provided to the requesting process and the process terminates.

Figure 16:
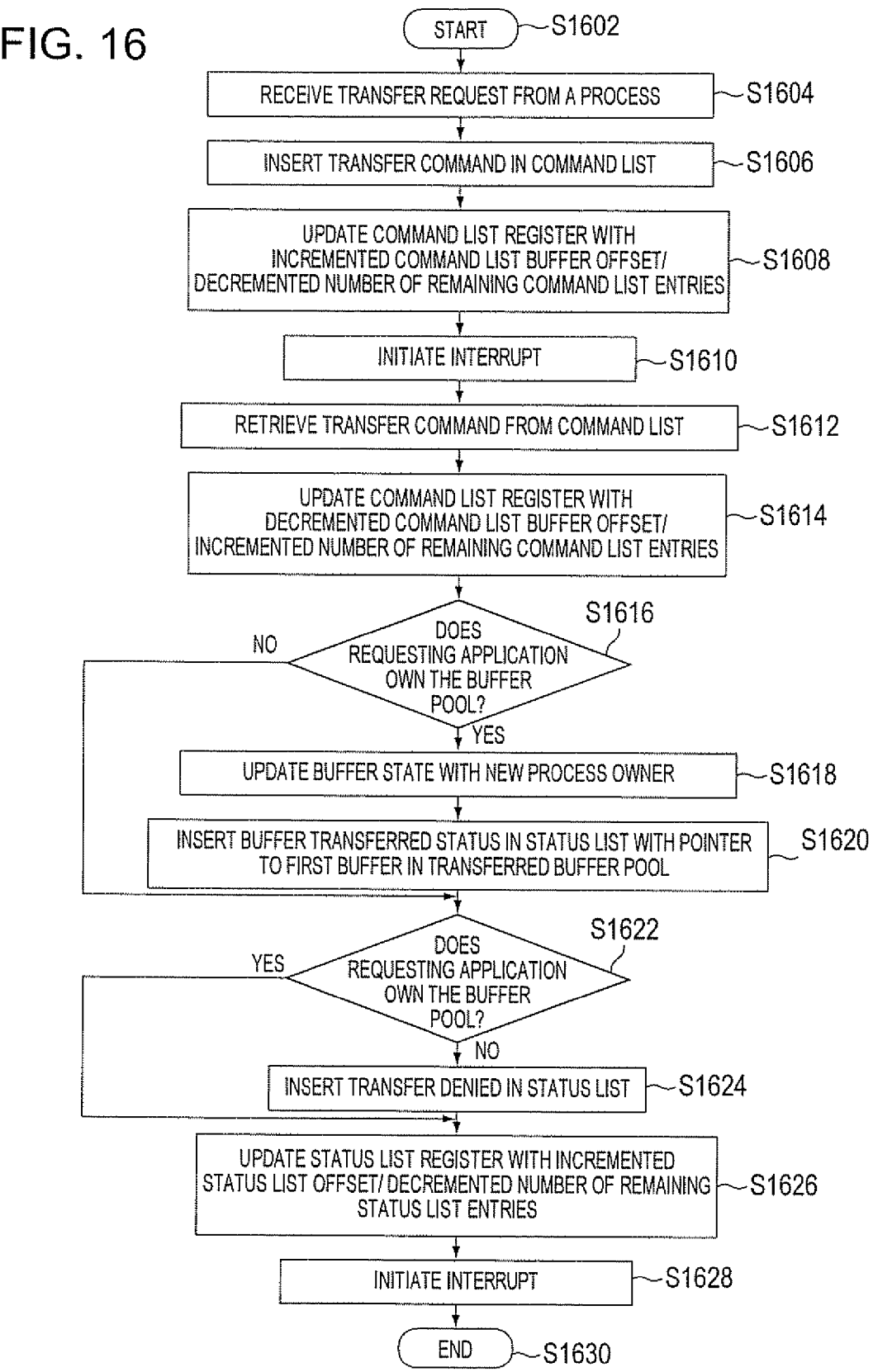
FIG. 16 is a flow diagram representing an example of a method for transferring a buffer between processes using an example of the described interprocess memory controller.

FIG. 16 is a flow diagram representing an example of a method for transferring a communication message stored in a virtual buffer between processes executed by a multi-process device using an example of the described interprocess memory controller. As shown in FIG. 16, operation of the method begins at step S1602 and proceeds to step S1604.

In step S1604, registration/configuration unit 102 may receive a TRANSFER command from a process and may pass the TRANSFER command to command-list/status-list control unit 104, and operation of the method continues to step S1606.

In step S1606, command-list/status-list control unit 104 may update the command list to include the TRANSFER command, and operation of the method continues to step S1608.

In step S1608, registration/configuration unit 102 may update the command list register with an incremented command list offset, and may decrement the number of remaining command list entries, and operation of the method continues to step S1610.

In step S1610, registration/configuration controller 202 may initiate an interrupt, and operation of the method continues to step S1612.

In step S1612, memory interface unit 108 may retrieve the transfer command from the command list, and operation of the method continues to step S1614.

In step S1614, memory interface unit 108 may update the command list register with a decremented command list offset, and may increment the number of remaining command list entries, and operation of the method continues to step S1616.

If, in step S1616, memory allocation unit 504 determines, by checking the virtual buffer state, that the process requesting the transfer owns the virtual buffer to be transferred, operation of the method continues to step S1618, otherwise, operation of the method proceeds to step S1622.

In step S1618, memory access unit 506 may update the virtual buffer state to reflect the processes receiving the transfer as the owner of the virtual buffer, and operation of the method continues to step S1620.

In step S1620, memory access unit 506 may insert a buffer transferred status update in the status list with a pointer to the first physical buffer in the transferred virtual buffer, and operation of the method continues to step S1622.

If, in step S1622, memory allocation unit 504 determines that the process requesting the transfer does not own the virtual buffer to be transferred, operation of the method continues to step S1624, otherwise, operation of the method proceeds to step S1626.

In step S1624, memory access unit 506 may insert a transfer denied status update in the status list, and operation of the method continues to step S1626.

In step S1626, memory access unit 506 may update the status list register with an incremented status list offset, and may decrement the number of remaining status list entries, and operation of the method continues to step S1628.

In step S1628, the memory interface controller 502 may initiate an interrupt and operation of the method continues to step S1630 and the process terminates.

Figure 17:
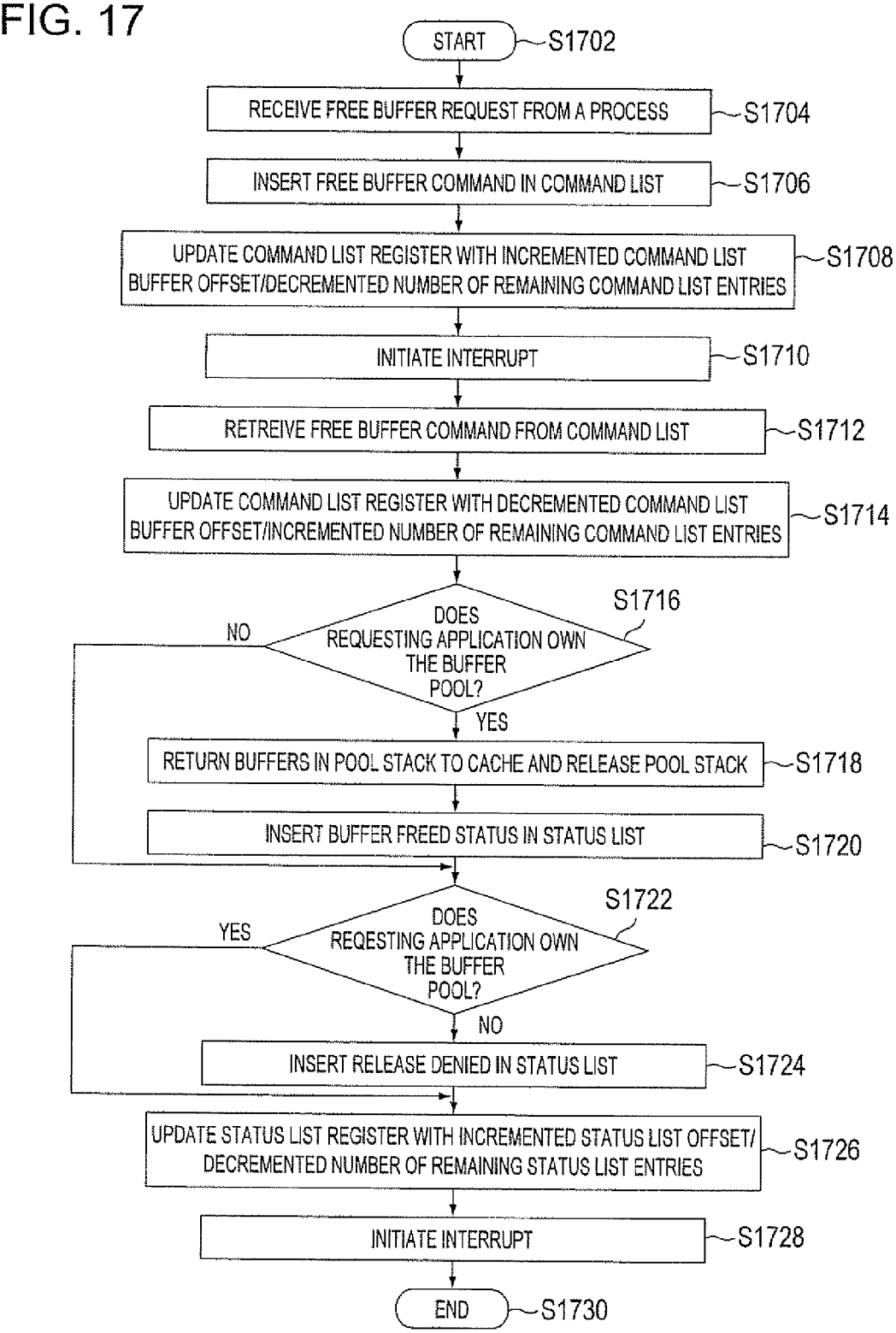
FIG. 17 is a flow diagram representing an example of a method for freeing a buffer using an example of the described interprocess memory controller.

FIG. 17 is a flow diagram representing an example of a method for freeing a virtual buffer using an example of the described interprocess memory controller. As shown in FIG. 17, operation of the method begins at step S1702 and proceeds to step S1704.

In step S1704, registration/configuration unit 102 may receive a FREE command from a process and may pass the FREE command to command-list/status-list control unit 104, and operation of the method continues to step S1706.

In step S1706, command-list/status-list control unit 104 may update the command list to include the FREE command, and operation of the method continues to step S1708.

In step S1708, registration/configuration unit 102 may update the command list register with an incremented command list offset, and may decrement the number of remaining command list entries, and operation of the method continues to step S1710.

In step S1710, registration/configuration controller 202 may initiate an interrupt, and operation of the method continues to step S1712.

In step S1712, memory interface unit 108 may retrieve the FREE command from the command list, and operation of the method continues to step S1714.

In step S1714, memory interface unit 108 may update the command list register with a decremented command list offset, and may increment the number of remaining command list entries, and operation of the method continues to step S1716.

If, in step S1716, memory allocation unit 504 determines that the process requesting the FREE owns the virtual buffer to be freed, operation of the method continues to step S1718, otherwise, operation of the method proceeds to step S1722.

In step S1718, memory access unit 506 may return physical buffers in the freed virtual buffer to the cache of free physical buffers, and operation of the method continues to step S1720.

In step S1720, memory access unit 506 may insert a buffer freed status update in the status list, and operation of the method continues to step S1722.

If, in step S1722, memory allocation unit 504 determines that the process requesting the FREE does not own the virtual buffer to be freed, operation of the method continues to step S1724, otherwise, operation of the method proceeds to step S1726.

In step S1724, memory access unit 506 may insert a FREE denied status update in the status list, and operation of the method continues to step S1726.

In step S1726, memory access unit 506 may update the status list register with an incremented status list offset, and may decrement the number of remaining status list entries, and operation of the method continues to step S1728.

In step S1728, the memory interface controller 502 may initiate an interrupt and operation of the method continues to step S1730 and the process terminates.

From the foregoing description, it will be appreciated that an approach for streamlining interprocess communication and for guarding a multi-process device from instability is disclosed. The described interprocess memory controller may enforce access rights to shared memory that has been allocated to the respective processes, thereby guarding a multi-process device from instability due to the unauthorized overwriting and/or unauthorized freeing of allocated memory. Further, the described interprocess memory controller approach may streamline interprocess communication by allowing data associated with an interprocess communication to be passed from a first process to a second process by passing a pointer to a virtual buffer in shared memory that contains the message data. In this manner, the described interprocess memory controller approach may avoid the inefficiency of interprocess communication approaches that copy message data from a shared memory controlled by a first process to a shared memory controlled by a second process.

For purposes of explanation, in the above description, numerous specific details are set forth in order to provide a thorough understanding of the described interprocess memory controller and the described approach for streamlining interprocess communication and the described approach for guarding a multi-process device from instability. It will be apparent, however, to one skilled in the art that the described approach for implementing the described interprocess memory controller and described approaches may be practiced without these specific details. In other instances, well-known structures and devices are shown in block diagram form in order to avoid obscuring the features of the described interprocess memory controller and methods for implementing the described approach for streamlining interprocess communication and methods for implementing the described approach for guarding a multi-process device from instability due to the unauthorized overwriting and/or unauthorized freeing of allocated memory.

While the described approach for implementing the described interprocess memory controller and the described approach for streamlining interprocess communication and the described approach for guarding a multi-process device from instability have been described in conjunction with the specific embodiments thereof, it is evident that many alternatives, modifications, and variations will be apparent to those skilled in the art. Accordingly, embodiments of the described interprocess memory controller and the described methods of use as set forth herein are intended to be illustrative, not limiting. There are changes that may be made without departing from the spirit and scope of the invention.

What is claimed is:

1. A multi-process device, comprising:
   at least one integrated circuit processor that supports concurrent execution of multiple processes;
   a physical memory that is shared by the multiple processes;
   a memory controller that controls access by the multiple processes to the shared physical memory, the memory controller comprising:
   a memory allocation unit that allocates at least one physical buffer for use by a first process of the multiple processes and updates a portion of the at least one physical buffer to include an identifier that identifies the first process; and
   a command unit that receives and stores in a command queue a transfer request from the first process, the transfer request requesting transfer of the at least one physical buffer from the first process to a second process and providing an identifier for the second process.

2. The multi-process device of claim 1, wherein the multiple processes are executed by a plurality of integrated circuit processors.

3. The multi-process device of claim 1, wherein the memory allocation unit comprises:
   a cache of pointers to unallocated physical buffers within the shared physical memory.

4. The multi-process device of claim 1, wherein the memory allocation unit allocates a first plurality of physical buffers for use by the first process, the memory allocation unit comprising:
   a first virtual buffer that stores a pointer to at least one of the first plurality of physical buffers allocated to the first process.

5. The multi-process device of claim 4, wherein each of the first plurality of physical buffers are a first size.

6. The multi-process device of claim 4, wherein the memory allocation unit allocates a second plurality of physical buffers for use by a second process and updates a portion of at least one of the second plurality of physical buffers to include an identifier that identifies the second process, the memory allocation unit comprising:
   a second virtual buffer that stores a pointer to at least one of the second plurality of physical buffers allocated to the second process.

7. The multi-process device of claim 6, wherein each of the second plurality of buffers are a second size.

8. The multi-process device of claim 1, further comprising:
   a memory access unit that, in response to the transfer request, transfers write access to the at least one physical buffer from the first process to the second process by updating the identifier stored in the at least one physical buffer to the identifier that identifies the second process.

9. The multi-process device of claim 8, further comprising:
   a status unit that receives and stores in a status queue a status update that notifies the second process of the transfer.

10. The multi-process device of claim 9, wherein the status update provides the second process with a pointer to data stored in at least one shared physical buffer.

11. A method of controlling access to portions of a physical memory shared among a plurality of processes executing on at least one integrated circuit processor, the method comprising:
    allocating at least one physical buffer for use by a first process of the plurality of processes;
    updating a portion of the at least one physical buffer to store an identifier that identifies the first process; and
    storing a transfer request from the first process in a command queue, the transfer request requesting transfer of the at least one physical buffer from the first process to a second process and providing an identifier for the second process.

12. The method of claim 11, wherein the plurality of processes are executed by a plurality of processors in a single integrated circuit.

13. The method of claim 11, further comprises:
    denying write access to the at least one physical buffer to any process with an identifier that does not match the identifier stored in the at least one physical buffer; and
    storing a cache of pointers, a plurality of the pointers in the cache each pointing to an unallocated physical buffer within the shared physical memory.

14. The method of claim 11, further comprising:
allocating a first plurality of physical buffers for use by the first process; and
storing a first virtual buffer that includes a pointer to at least one of the first plurality of physical buffers allocated to the first process.

15. The method of claim 14, wherein each of the first plurality of physical buffers are a first size.

16. The method of claim 14, further comprising:
allocating a second plurality of physical buffers for use by a second process;
updating a portion of at least one of the second plurality of physical buffers to include an identifier that identifies the second process; and
storing a second virtual buffer that includes a pointer to at least one of the second plurality of physical buffers allocated to the second process.

17. The method of claim 16, wherein each of the second plurality of buffers are a second size.

18. The method of claim 11, further comprising:
transferring write access to the at least one physical buffer from the first process to a second process by updating the identifier stored in the at least one physical buffer to an identifier that identifies the second process.

19. The method of claim 18, further comprising:
notifying the second process of the transfer.

20. The method of claim 18, further comprising:
providing the second process with a pointer to transferred data stored in at least one physical buffer.

21. A memory controller, comprising:
a command list control unit that receives and stores commands received from a plurality of processes executing on one or more of a plurality of integrated circuit processors within a multi-process device;
a memory interface unit that retrieves and executes commands from the command list control unit to control allocation of a physical memory buffer from a physical memory, execution of at least one of the commands resulting in a change of a status parameter portion of the physical memory buffer that controls access to the physical memory buffer by the plurality of processes; and
a command unit that receives and stores in a command queue a transfer request from a first process, the transfer request requesting transfer of the at least one physical buffer from the first process to a second process and providing an identifier for the second process.

22. The memory controller of claim 21, further comprising:
a status list control unit that receives from the memory interface unit a status update indicating a result of the memory interface unit executing a command, wherein the received status update is retrieved from the status list control unit by one or more of the plurality of processes executing on the one or more plurality of integrated circuit processors.

23. The memory controller of claim 21, the memory interface unit further comprising:
a memory allocation unit that manages a plurality of physical memory buffers within the physical memory as a virtual buffer, the virtual buffer being comprised of a plurality of physical memory buffers.

24. The memory controller of claim 23, wherein the status parameter for the virtual buffer is contained in a portion of a physical memory buffer within the virtual buffer.

25. The memory controller of claim 23, wherein the status parameter for the virtual buffer and a pointer to another physical memory buffer within the virtual buffer are contained in a portion of a physical memory buffer within the virtual buffer.

* * * * *